(12) United States Patent
Brooks et al.

(10) Patent No.: US 8,833,399 B2
(45) Date of Patent: Sep. 16, 2014

(54) PIPE COMPRESSION CLAMP

(71) Applicants: Carl Brooks, Caldwell, ID (US); Larry Mehlenbacher, Stanville, NY (US)

(72) Inventors: Carl Brooks, Caldwell, ID (US); Larry Mehlenbacher, Stanville, NY (US)

(*) Notice: Subject to any disclaimer, the term of this patent is extended or adjusted under 35 U.S.C. 154(b) by 0 days.

(21) Appl. No.: 13/749,467

(22) Filed: Jan. 24, 2013

(65) Prior Publication Data

US 2013/0186502 A1   Jul. 25, 2013

Related U.S. Application Data

(60) Provisional application No. 61/590,212, filed on Jan. 24, 2012.

(51) Int. Cl.
*F16L 55/16*   (2006.01)
*F16L 55/172*   (2006.01)
*F16L 55/18*   (2006.01)
*F16L 33/06*   (2006.01)

(52) U.S. Cl.
CPC ............ *F16L 55/18* (2013.01); *F16L 55/172* (2013.01); *F16L 33/06* (2013.01)
USPC ............................................. 138/99; 138/97

(58) Field of Classification Search
USPC .................................................... 138/99, 97
See application file for complete search history.

(56) References Cited

U.S. PATENT DOCUMENTS

| | | | |
|---|---|---|---|
| 4,023,831 A | 5/1977 | Thompson | |
| 4,357,961 A | 11/1982 | Chick | |
| 4,386,796 A | 6/1983 | Lyall et al. | |
| 4,413,388 A * | 11/1983 | Akhtar-Khavari et al. | 24/279 |
| 4,606,377 A * | 8/1986 | Montgomery | 138/99 |
| 4,630,647 A * | 12/1986 | Thomson | 138/99 |
| 5,254,824 A | 10/1993 | Chamberlain et al. | |
| 5,613,807 A | 3/1997 | Reber et al. | |
| 5,732,743 A | 3/1998 | Livesay | |
| 6,217,688 B1 | 4/2001 | Landers | |
| 6,386,236 B1 | 5/2002 | Buckley | |
| 2009/0020180 A1* | 1/2009 | Bowie | 138/99 |

FOREIGN PATENT DOCUMENTS

| EP | 361019 A | * | 4/1990 |
|---|---|---|---|
| GB | 1355906 A | * | 6/1974 |

OTHER PUBLICATIONS www.directindustry.com/prod/norma-group/exhaust-pipe-clamps-14287-33982.html; Norma Group, The Virtual Industrial Exhibition; Jan. 6, 2012.

* cited by examiner

*Primary Examiner* — Patrick F Brinson
(74) *Attorney, Agent, or Firm* — Dwayne E. Rogge; Schacht Law Office, Inc.

(57) ABSTRACT

Disclosed herein is a high compression pipe clamp which in one embodiment has a hollow rigid inner housing and a hollow rigid outer housing. The hollow rigid inner housing may have a first end, an outer diameter, and a first strap bracket. The hollow rigid outer housing may have a first end, and inner diameter and a second strap bracket wherein the inner diameter of the outer housing is larger than the outer diameter of the inner housing to fit thereover. A threaded rod is also disclosed, the threaded rod passing through the inner housing and outer housing and a threaded nut engaging the threads on the threaded rod.

7 Claims, 5 Drawing Sheets

PIPE COMPRESSION CLAMP

RELATED APPLICATIONS

This application claims priority benefit of U.S. provisional application, Ser. No. 61/590,212, filed Jan. 24, 2012, to Carl M. Brooks and Larry Mehlenbacher. The provisional application incorporated herein by reference.

BACKGROUND OF THE DISCLOSURE a) Field of the Disclosure

This application applies to the field of temporary and re-usable compression pipe clamps to be used in pipe repair processes.

SUMMARY OF THE DISCLOSURE

Disclosed herein is a high compression pipe clamp which in one embodiment has a hollow rigid inner housing and a hollow rigid outer housing. The hollow rigid inner housing may have a first end, an outer diameter, and a first strap bracket. The hollow rigid outer housing may have a first end, an inner diameter and a second strap bracket wherein the inner diameter of the outer housing is larger than the outer diameter of the inner housing to fit thereover. A threaded rod is also disclosed, the threaded rod passing through the inner housing and outer housing and a threaded nut engaging the threads on the threaded rod.

A strap is also disclosed, the strap having a first end attached to the first strap bracket and a second end attached to the second strap bracket. The strap in operation wraps about the pipe to compress the pipe radially. While strap-type pipe wrenches are well known in the art, the disclosed pipe clamp is made to achieve very high compression of the pipe and external attachments thereto.

The pipe clamp is arranged such that rotation of the threaded rod in a first rotational direction relative to the threaded nut repositions the first strap bracket towards the second strap bracket to reduce the effective inner diameter of the strap and housing combination around a section of pipe.

In one form, the hollow rigid inner housing and the hollow rigid outer housing are rectangular in cross section. They may also be rectangular or square in cross section. Square being a special rectangle with even or equal sides. The hollow rigid inner housing and the hollow rigid outer housing may also be curvilinear, triangular, or substantially any other shape in cross section.

In one form, the pipe clamp as recited above is arranged wherein the strap is positionably coupled to one or both of the first strap bracket or second strap bracket. This allows for an initial adjustment for different diameter pipes, and improves convenience of application of the clamp in position.

The pipe clamp as recited wherein the strap comprises a first portion and a separate second portion adjustably coupled to the first portion.

The pipe clamp as recited above may be used in a method for repairing or reinforcing a portion of pipe comprising several steps. These steps may include: providing a compression pipe clamp as recited above, disposing a volume of adhesive to a portion of the outer surface of the pipe; positioning a rigid sleeve portion over the adhesive; and/or positioning the strap of the pipe clamp around the pipe and sleeve. The threaded rod may then be rotated in a first rotational direction relative to the threaded nut so as to reposition the first strap second strap bracket towards the second strap bracket to reduce the effective inner diameter of the strap and housing combination around a section of pipe. In this way, the pipe clamp compresses the sleeve onto the pipe, providing an exceptional seal during final repair of the pipe.

DESCRIPTION OF THE PREFERRED EMBODIMENTS

Figure 1:
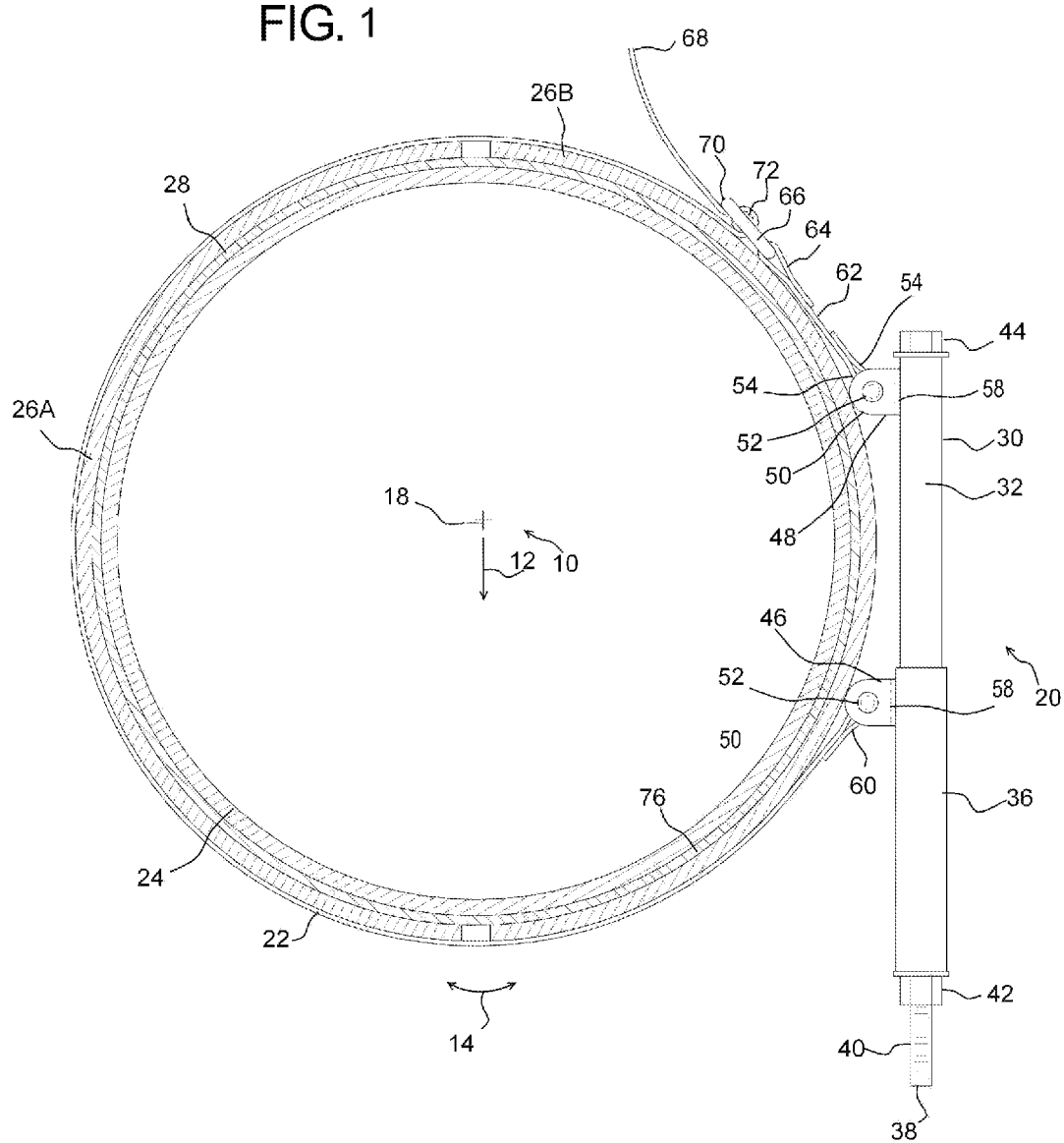
FIG. 1 is and end cutaway view of a pipe in the process of being repaired using the disclosed compression clamp in one form.

This disclosure describes a compression pipe clamp 20 which may be used in combination with several of the repair methods claimed in U.S. patent application Ser. No. 12/368,106 which is now U.S. Pat. No. 7,938,146, incorporated herein by reference. The disclosed pipe clamp provides for a high compression between a repair sleeve and a pipe to be repaired or reinforced. Such applications include the repairs shown in FIGS. 26, 31, 32, 35, 36, 37, 38 of the aforementioned patent. The particular use of the apparatus is not limited however to these repair methods, but has other applications to exerting a high compression force to pipe and similar structures.

The reference patent has a great deal of detail of several variants of a repair process. One repair process generally comprises the steps of cleaning and potentially upgrading the outer surface of the pipe in the location to be repaired, and removing contaminants from the surface. Methyl ethyl ketone (MEK) or other cleansing agents may be utilized to remove all surface contaminants. A fine layer of adhesive may then be applied to the outer surface of the pipe or alternatively to the inner surface of a repair sleeve or plurality of repair sleeves. It may be desired to then disperse (distribute evenly) this layer of adhesive 28 at which point the repair sleeve is placed over top of the pipe to cover the section to be repaired or reinforced. The compression clamps disclosed herein may then be placed around the entire assembly and compressed there about to further spread the adhesive layer 28 and firmly secure the repair sleeve 26 in place. At this point, the edges of the repair sleeve may be welded to the pipe, the entire apparatus may be wrapped with a rigid securing component, or potentially the compression clamps 20 may remain in place.

Figure 3:
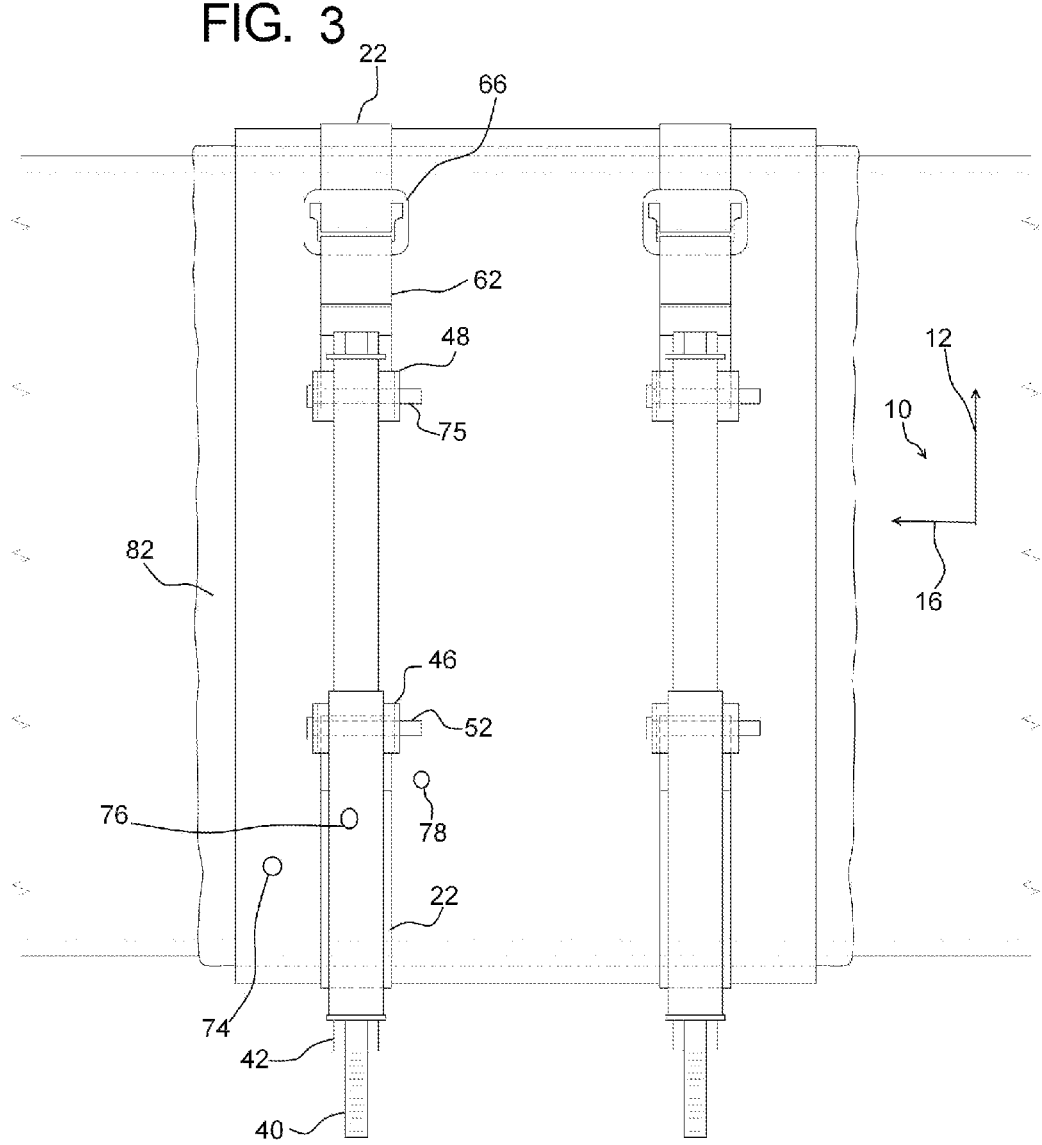
FIG. 3 is a top view of a plurality of the disclosed compression pipe clamps in one form, being used in a repair process.

Before beginning, a detailed description an axes systems 10 is shown in FIG. 1 and FIG. 3 generally comprising a radial axis 12 extending outward from the center (axis) 18 of a pipe or equivalent structure. Also disclosed is a circumferential "axis" 14 generally normal to the radial axis 12, and a longitudinal axis 16 (FIG. 3) generally aligned with the length of the pipe and generally orthogonal to the radial axis 12. These axes are intended for use in description of particular directions and are not intended to limit the placement or use of the pipe clamp itself.

Looking to FIG. 1, the pipe clamp 20 is shown having a strap 22 positioned around the circumference of a pipe 24 for securing of a repair sleeve 26 (combined 26A/26B) upon the outer surface of the pipe 24 with a layer of adhesive 28 there between. The layer of adhesive 28 may be an adhesive which does not cure to a rigid state, but maintains flexibility when fully cured. In some applications, the repair sleeve 26 is attached by other than adhesives such as by welding, fasteners, or a combination of securing methods and materials.

The compression clamp 20 as shown comprises an inner housing 30, with an outer surface 32 positioned within an inner surface 34 of the outer housing 36. The inner surface 34 of the inner housing 30 is more easily seen in FIG. 2. Both the inner housing 30 and outer housing 36 may be cylindrical, square, rectangular, or other shapes, provided that the outer surface 32 of the inner housing 30 is allowed to slide (linearly reposition) within at least a portion of the inner surface 34 of the outer housing 36. The reason for this will be described below in some detail.

Figure 2:
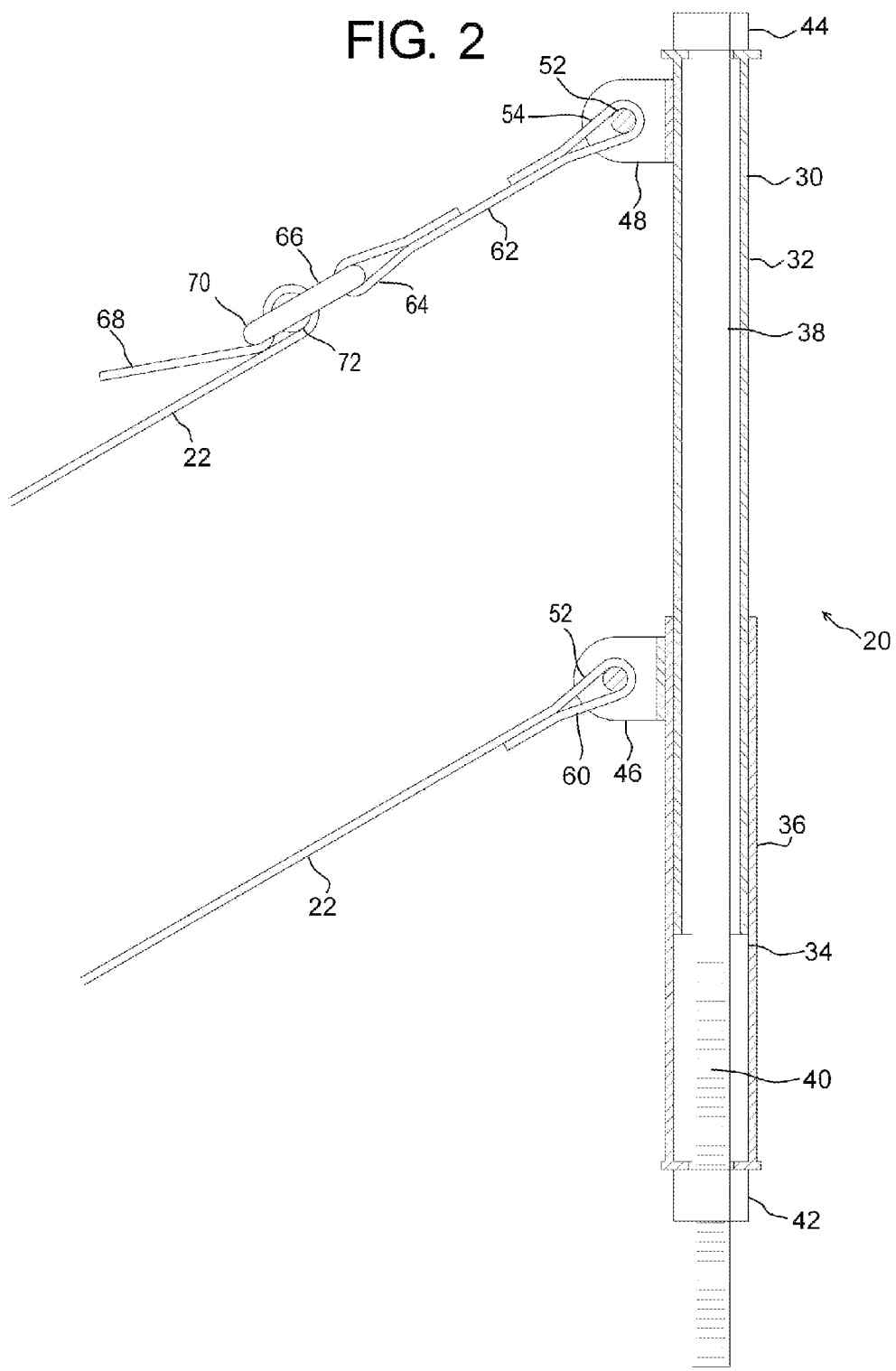
FIG. 2 is a side cutaway view of the clamp of FIG. 1 in one form.

The inner housing 30 of the example shown in FIG. 2 is hollow, to allow at least for passage of a threaded rod or shaft 38 having threads 40 provided on at least a portion thereof. A nut 42 may be provided on at least one end of the threaded rod 38. The nut 42 configured to reposition along the axis of the rod 38 when rotated relative to the rod 38 to adjust the distance between the nut and the opposing end of the threaded rod. While in the example shown, the opposing end of the rod 38 comprises a tensioning nut or bolt head 44. In another variation, the rod 38 can be threaded on both ends and have a positionable nut 42 on both ends. In yet another variation, the nut 42 could be welded to the outer housing 36 or alternatively switched end for end relative to the clamp 20 so as to be attached to, or adjacent to the inner housing 30. It is also conceived that a portion of either housing could be threaded and this threaded portion could replace the nut 42. The important elements being that as the threaded rod 38 or nut 42 is rotated, the inner housing 30 repossessions axially along the outer housing 36 to adjust the effective distance between strap brackets 46 and 48.

As shown, a first strap bracket 48 is welded, bolted, or otherwise attached to the inner housing 30. The first strap bracket 48 in one form has a plurality of extensions 50 more easily seen in FIGS. 1 and 3, each extension 50 with a surface defining a void therethrough. The void allows for passage and securing of a pin or bolt 52. The aforementioned strap 22 attaches to this bolt 52 such as by a sewn loop 54 or other methods and apparatus. The strap 22 may then be wrapped about the pipe 24, repair sleeve 26, and then attached to a second bracket 46 also attached by a weld 58 or equivalent attachment, to the outer housing 36. Again, the strap bracket 46 in one form comprises a plurality of extensions 50 and a pin or bolt 52 passing there through. Again, an end loop 60 may be provided on the end of the strap 22 to secure the strap 22 to the bracket 46.

To allow for adjustability of the strap 22, a length adjustment system may be utilized. While several different forms are conceived, one particular embodiment is shown in FIG. 2 wherein the strap 22 further comprises a buckle strap 62 having loops 54 and 64 in either end. The loop 64 in one form couples to a buckle 66 configured such that the bitter end 68 of the strap 22 passes under a first portion 70 of the buckle 66, over a roller portion 72, and back under the first portion 70 with sufficient length that as the user pulls on the bitter end 68, the effective length of the strap between the buckle 66 and strap bracket 46 shortens to slightly tension the strap 22 In place about the repair sleeves 26 and pipe 24.

Once the appropriate number of compression clamps 20 are in place. about the repair structure (sleeve 26), either the bolt head 44 and/or nut 42 are rotated to draw the bracket 48 toward the bracket 46 and thus compress the strap 22 about the repair structure.

U.S. Pat. No. 7,938,146 discloses additional steps of a repair process which may be used in conjunction with the disclosed clamp. The process including additional steps of disposing at least one layer of fibrous material upon the layer of adhesive; wherein the layer of fibrous material comprises fibers such as carbon fiber, fiberglass and similar materials. As can be seen in FIG. 3 for example the longitudinal edges of the sleeve 26 are exposed, which would allow the layer of fibrous material to be attached thereto. Alternatively, the layer of fibrous material could be applied soon after removing the clamp(s) 20 after partial curing of the adhesive 28. A further step in the repair process may be to dispose at least one layer of a second adhesive upon and/or between the fibers of the fibrous material. It may be desired that the second adhesive is comprised of a compound which cures to a substantially rigid state such as an epoxy/resin; whereas the first adhesive may cure to a semi-rigid state and never become substantially rigid.

A following step of the repair process may be to dispose at least one layer of a second fibrous material upon the layer of second adhesive. This layer of second fibrous material may comprise fibers substantially in alignment with the circumference of the pipe; and a portion of the second adhesive may be disposed between adjacent fibers of the second fibrous material when cured.

Figure 4:
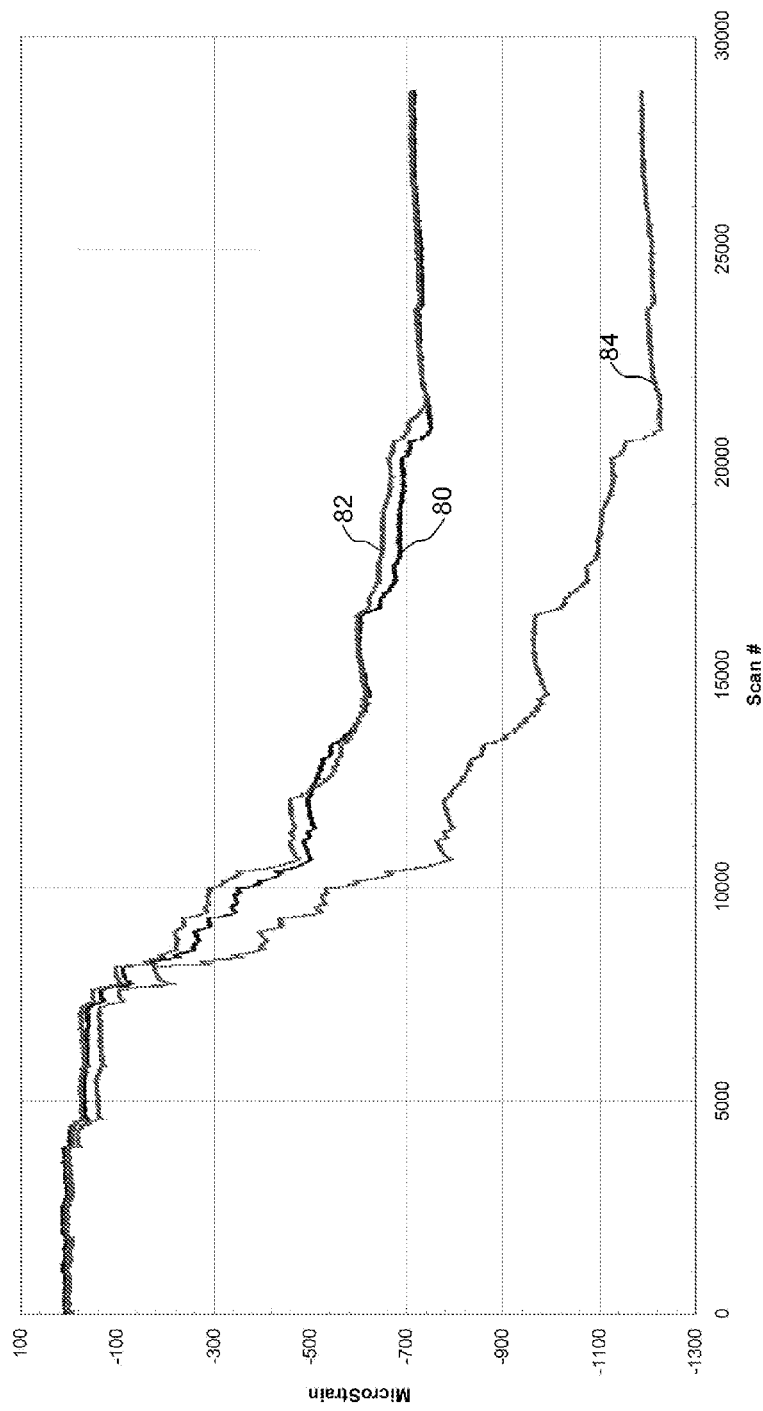
FIG. 4 is a first sample set of hoop strain gauge readings from a test of one embodiment of the disclosed compression pipe clamp.
Figure 5:
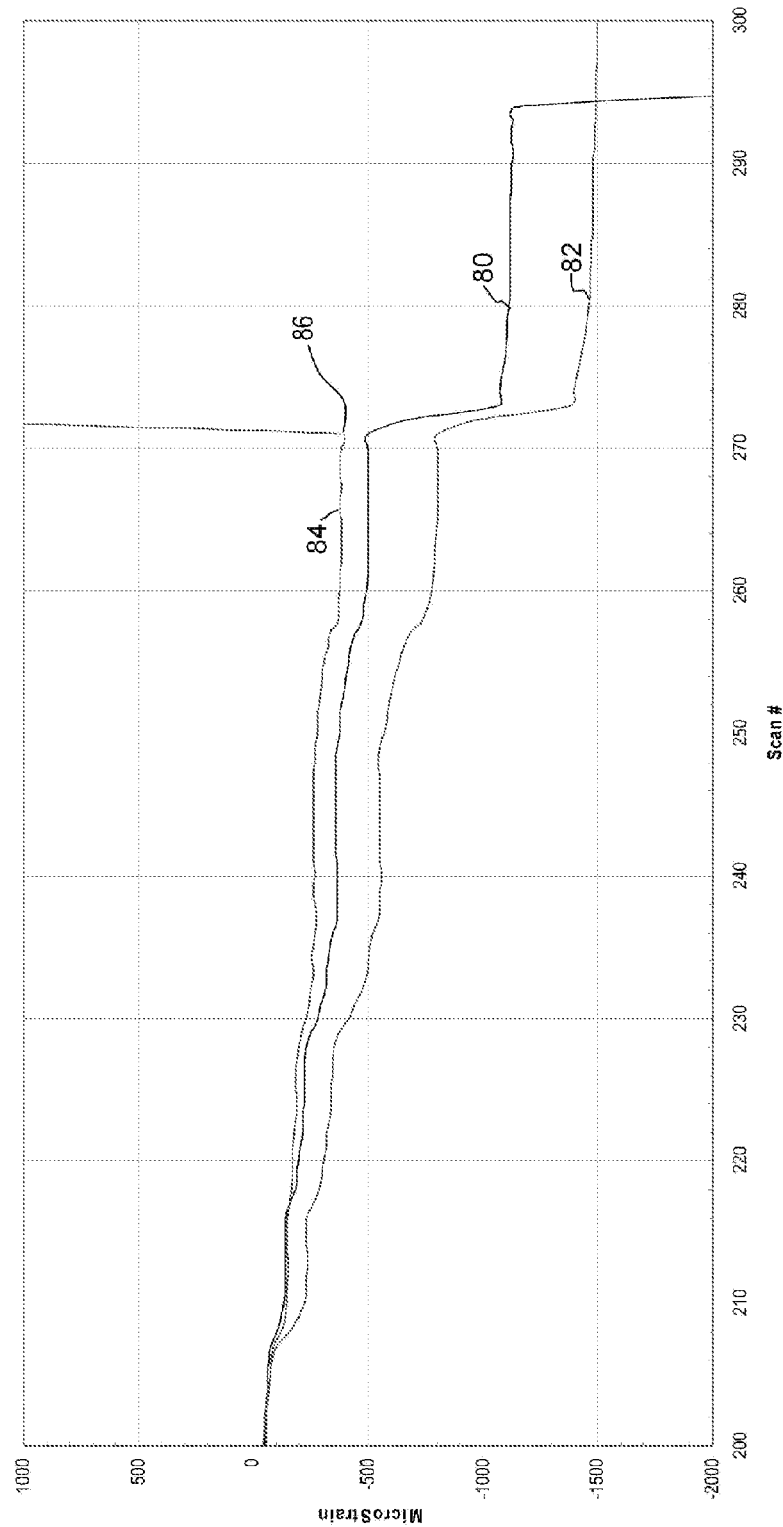
FIG. 5 is a second sample set of hoop strain gauge readings from a test of one embodiment of the disclosed compression pipe clamp.

The graphs below and FIGS. 4 and 5 show the strain results of sensors 74, 76, and 78 as shown in FIG. 3 placed in the adhesive layer 28 between the repair sleeves 26 and the pipe 24. The charts show strain curves 80, 82, and 84 of two separate tests at sensors 74, 76, and 78 respectively. At point 86, input at sensor 78 was lost. The y-axis shows the microstrain level, and the x-axis shows the scan # as the tension on the clamp was increased. Sensor 76, curve 82 showed a higher strain as it was placed directly under a clamp 20 during testing. The equivalent pressure (Eq. Pressure) is the internal pipe pressure that would have to be exceeded for hoop stresses in the pipe to go into tension. As a point of reference, 72% SMYS for the 12.75-inch×0.188-inch, Grade x42 pipe is 890 PSI.

|   | Gage | ∈ Hoop (microstrain) | Hoop (stress) | Eq. Press | Avg Eq. Press |
|---|---|---|---|---|---|
| S1 | 1 | −1114 | −33,420 | −980 | −869 |
|   | 2 | −1462 | −43,860 | −1,287 | (psi) |
|   | 3 | −385 | −11,550 | −339 |   |
| S2 | 1 | −749 | −22,470 | −659 | −798 |
|   | 2 | −1230 | −36,900 | −1,082 | (psi) |
|   | 3 | −741 | −22,230 | −652 |   |

What was Recorded?
Two (2) samples used for measurement
3 bi-axial strain gages used for monitoring
Strain gage locations
  Gage 1: ½" from weld
  Gage 2: 2½" from weld
  Gage 3: 6½" from weld
Recorded strain rates during installation of half shells (sleeves) on specimens.
Hoop 2 did see higher strains due to the location of one the clamps directly on top of the gage.

Assessment of Measurements

The make-up of the reference patented repair method introduces compressive hoop stresses.

For the given pipe geometry (12.75-inch×0.188-inch, Grade X42 pipe), 72% SMYS is 890 psi—the strain measurements show that, as a minimum, an internal pressure of 800 psi (65% SMYS) would have to be reached before overcoming the compression pre-load in the reference patented repair method.

The findings of this study confirm why strains in pipes repaired with the reference patented repair method using the disclosed compression pipe clamp are lower than other comparable composite repair systems, as well as the significant improvements observed with the fatigue life of the 75% corrosion test sample.

While the present invention is illustrated by description of several embodiments and while the illustrative embodiments are described in detail, it is not the intention of the applicants to restrict or in any way limit the scope of the appended claims to such detail. Additional advantages and modifications within the scope of the appended claims will readily appear to those sufficed in the art. The invention in its broader aspects is therefore not limited to the specific details, representative apparatus and methods, and illustrative examples shown and described. Accordingly, departures may be made from such details without departing from the spirit or scope of applicants' general concept.

We claim:

1. A high compression pipe clamp comprising:
   a. a hollow rigid inner housing having a first end, an outer diameter, and a first strap bracket at a first end of the inner housing;
   b. a hollow rigid outer housing having a first end, an inner diameter and a second strap bracket attached at the first end wherein the inner diameter of the outer housing is larger than the outer diameter of the inner housing to encircle the inner housing;
   c. wherein a second end of the inner housing is positioned inside a second end of the outer housing;
   d. a threaded rod passing through the inner housing and outer housing;
   e. a threaded nut engaging the threads on the threaded rod;
   f. a strap having a first end attached to the first strap bracket and a second end attached to the second strap bracket;
   g. a strap length adjustment system allowing for adjustment of the effective length of the strap between the first end and the second end; and
   h. wherein rotation of the threaded rod in a first rotational direction relative to the threaded nut repositions the first strap bracket towards the second strap bracket to reduce the effective inner diameter of the strap and housing combination around a section of pipe.

2. The pipe clamp as recited in claim 1 wherein the strap is positionably coupled to one or both of the first strap bracket or second strap bracket.

3. The pipe clamp as recited in claim 1 wherein the strap comprises a first strap portion and a separate second strap portion adjustably coupled to the first strap portion.

4. The pipe clamp as recited in claim 1 wherein the hollow rigid inner housing and the hollow rigid outer housing are rectangular in cross section.

5. The pipe clamp as recited in claim 4 wherein the hollow rigid inner housing and the hollow rigid outer housing are square in cross section.

6. A method for repairing or reinforcing a portion of pipe comprising the steps of:
   a. providing a compression pipe clamp as recited in claim 1;
   b. disposing a volume of a first adhesive to a portion of the outer surface of the pipe;
   c. positioning a rigid sleeve over the first adhesive;
   d. positioning the strap of the pipe clamp around the rigid sleeve;
   e. rotating of the threaded rod in a first rotational direction relative to the threaded nut repositions the first strap second strap bracket towards the second strap bracket to reduce the effective inner diameter of the strap and housing combination around a section of pipe; and
   f. releasing and removing the compression pipe clamp.

7. The method as recited in claim 6 further comprising the step of:
   a. disposing at least one layer of fibrous material upon the layer of adhesive;
   b. wherein the layer of fibrous material comprises fibers;
   c. disposing at least one layer of a second adhesive upon the fibrous material;
   d. wherein the second adhesive is comprised of a compound which cures to a substantially rigid state;
   e. disposing at least one layer of a second fibrous material upon the layer of second adhesive;
   f. wherein the layer of second fibrous material comprises fibers substantially in alignment with the circumference of the pipe; and
   g. wherein a portion of the second adhesive is disposed between adjacent fibers of the second fibrous material when cured.

* * * * *